3,759,842
ACTIVATED GRAPHITE
Giuseppe Bianchi and Antonio E. Nidola, Milan, Italy, assignors to Oronzio de Nora Impianti Elettrochimici S.p.A., Milan, Italy
Filed Jan. 26, 1971, Ser. No. 109,781
Claims priority, application Italy, Nov. 24, 1970, 32,119/70, Patent 909,429
Int. Cl. B01j *11/06*
U.S. Cl. 252—447       8 Claims

ABSTRACT OF THE DISCLOSURE

Graphite impregnated with at least one valve metal oxide such as molybdenum oxide alone or optionally co-deposited with an oxide of a metal of the eighth group of the periodic table which is useful in an amalgam denuder and a process for the preparation and use of the said impregnated graphite.

STATE OF THE ART

Graphite is now extensively used in the electrolytic chlor-alkali field where mercury cathode cells are used to electrolyze an aqueous alkali metal halide solution such as sodium chloride to form the corresponding halogen such as chlorine gas at the anodes of the cell. The alkali metal is deposited on the flowing mercury cathode and dissolves in the mercury to form an alkali metal amalgam which is continuously withdrawn from the cell. The amalgam is then treated in a separate compartment called a denuder wherein it is reacted with water to form an alkali metal hydroxide solution and hydrogen according to the overall reactions as follows:

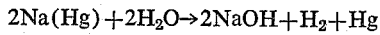

$$2Na(Hg) + 2H_2O \rightarrow 2NaOH + H_2 + Hg$$

In spite of its high chemical affinity, this reaction can proceed at a practically useful rate only if it is catalyzed by the presence of a suitable electronic conductor, whereby the reaction acquires the characteristics of an electrochemical process. Accordingly, a shortcircuited galvanic cell is established in that said electronic conductor will perform the function of the cathode at which hydrogen evolution takes place, while the sodium content in the amalgam is transferred to the alkaline solution, according to the following half-cell reactions:

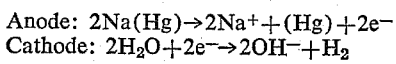

Anode: $2Na(Hg) \rightarrow 2Na^+ + (Hg) + 2e^-$
Cathode: $2H_2O + 2e^- \rightarrow 2OH^- + H_2$ Of these half-reactions the cathodic one or hydrogen evolution is the rate determining reaction. Accordingly, the catalytic material must fulfill the following requisites:

be an electronic conductor;
be insoluble in mercury as well as in aqueous alkali metal hydroxides;
exhibit a relatively low overvoltage to hydrogen evolution;
remain unwetted by the amalgam, which would otherwise stick to the catalytic surface and thus hinder the cathodic reaction, due to the extremely high overvoltage opposed by mercury to hydrogen discharge;
have a low or moderate cost.

Of the several materials that might at first seem adequate for the purpose, graphite has practically remained the only acceptable material. No known conductor having metallic properties was completely immune from one drawback or another. Steel, for instance, although being a cheap metal and characterized by a relatively low hydrogen overvoltage, becomes very soon coated with a very adherent and impervious film of mercury, as soon as contacted by an alkali metal amalgam in an alkaline solution. Graphite, on the contrary, although it exhibits a higher overvoltage than steel and other metals, remains unwetted by mercury under all conditions. Accordingly, all the amalgam denuders that have been in commercial use till now used a cathodic mass of graphite. In denuders of horizontal construction, such as described in U.S. Pat. 1,613,966 such a catalytic mass consists of a plurality of graphite plates or "grids" parallel to the equicurrent streams of sodium hydroxide and amalgam, arranged so as to establish with them a three-phase line of contact. In denuders of vertical construction, such as described in U.S. Pat. 2,083,648 a trickling stream of amalgam runs downwardly through a tower over and in contact with a mass of relatively small pieces of solid graphite catalyst, so arranged in the tower in the path of the amalgam stream as to finely subdivide it, while a stream of water is passed upwardly through the graphite catalyst particles.

Despite its better performance when compared with other materials, graphite is far from being an ideal catalyst for amalgam decomposition because it shows a considerable tendency to loose its activity through adsorption of impurities that might be present in the reaction water and whose poisoning effect sometimes becomes remarkable even when they are present in such minute amounts as to be undetectable by the most refined analytical methods. Whenever such activity loss occurs, it is necessary to shut down the electrolysis process in the cell so affected, drain the denuder or decomposer and proceed with its decontamination, either by introducing steam or by acid washing, which entails a considerable amount of labor and a loss of production. Moreover, in order to obtain a safer and more regular operation, notwithstanding the inevitable occurrence of any contamination, the decomposer is usually oversized which involves not only a higher initial cost for the equipment but also a larger holdup of expensive mercury.

Several methods have been devised in the past to increase the catalytic activity of graphite. FIAT Report No. 816 (Office of Technical Services, Washington, D.C., 1946) describes impregnating graphite under a vacuum with a ferric chloride solution and then heating the impregnated graphite to a temperature of 300° C. or higher, in air, so as to decompose the salt and convert it into some form of iron oxide. Experiments carried out on graphite treated according to such method show that the catalytic activity on amalgam decomposition rate results, at the beginning of the test, in an increase of several times, but, the performance deteriorates very rapidly, i.e. in a matter of a few hours, to the same reaction rate as that obtained with untreated graphite.

Other known methods, all of which basically consist of impregnating the graphite with a molybdate solution, without any further treatment, are extensively described in a paper by Jaksic (Electrochemical Technology, Vol. 4 (1966), pages 49–56). This method is based on the well established fact that molybdenum in the metallic state, besides exhibiting a low hydrogen overvoltage, remains unwetted when contacted with pure mercury or with an alkali metal amalgam. The evidence produced by Jaksic as well as the in cited references indicates that in fact the molybdate salt deposited on graphite by simple evaporation of the aqueous medium is then reduced to the metallic state by the action of sodium amalgam and atomic hydrogen is released in the course of the decomposition process.

OBJECTS OF THE INVENTION

It is an object of the invention to provide novel graphite impregnated with at least one valve metal oxide.

It is another object of the invention to provide graphite impregnated with coprecipitated valve metal oxide and a metal oxide of the eeighth group of the periodic table.

It is an additional object of the invention to provide a novel process for the preparation of graphite having increased catalytic activity in amalgam denuders.

These and other objects and advantages of the invention will become obvious from the following detailed description.

THE INVENTION

The novel graphite of the invention comprises graphite impregnated with at least one valve metal oxide or a valve metal oxide coprecipitated with a metal oxide of the eighth group of the periodic table. The graphite is preferably powdered or in lumps or spheres of 10 to 40 mm. in diameter to insure maximum surface area for contact with the amalgam. The amount of metal oxide in the graphite may vary but is usually between 1 to 30% by weight of the impregnated graphite. The catalytic activity is of high and durable rate.

Examples of suitable valve metals or film forming metals whose oxides are used for the invention are molybdenum, zirconium, tantalum, titanium, and aluminum. Examples of suitable metals of the eighth group of the periodic table which may be coprecipitated with the valve metal are nickel, palladium, iridium, osmium, ruthenium, rhodium, cobalt and iron. The coprecipitated mixed metal oxides have the advantage of increasing the catalytic activity of the graphite more than a single valve metal oxide. Molybdenum oxide is coprecipitated with a metal oxide of the eighth group into a graphite core by the following reaction

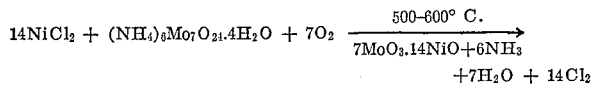

$$14NiCl_2 + (NH_4)_6Mo_7O_{24}\cdot 4H_2O + 7O_2 \xrightarrow{500-600°\ C.} 7MoO_3.14NiO + 6NH_3 + 7H_2O + 14Cl_2$$

The novel process of the invention for the preparation of the impregnated graphite comprises removing moisture and air from graphite under vacuum, immersing the graphite under vacuum in a solution containing a thermally decomposible salt of a metal of the eighth group of the Periodic Table, drying the impregnated graphite and heating the dried graphite to a temperature high enough to decompose the thermally reducible salts to the corresponding metal oxides.

The graphite is preferably heated for several hours, i.e. 1 to 3 hours, at temperatures slightly above the boiling point of water, under an absolute pressure of 10 to 15 mm. Hg, preferably about 10 mm. Hg. This removes the moisture and air from the graphite so the impregnating solution can penetrate into the pores of the graphite.

The solvent for the impregnating solution may be a solvent such as water, aqueous ethanol, or organic solvent such as formamide, dimethyl formamide, lower alkanols such as ethanol, isopropanol, etc. The specific solvent will depend upon the specific thermally reducible salts used in the impregnation step. The immersion step is preferably carried out at room temperature for several hours under the same vacuum used for the pre-drying step.

After immersion, the graphite is filtered off from the impregnating solution and dried preferably under a reduced absolute pressure at temperatures slightly above the boiling point of the solvent of the impregnating solution. The dried graphite is then heated in an oxidizing atmosphere at temperatures high enough to decompose the thermally reducible salts to the metal oxides. This temperature will vary depending upon the specific salts but will usually be between 300 and 650° C. preferably about 350 to 550° C.

Example of thermally reducible salts of valve metals and metals of the eighth group of the Periodic Table are ammonium halides such as chlorides, nitrates, etc.

Referring now to the drawings.

In the following examples there are described several preferred embodiments to illustrate the invention. However, it should be understood that the invention is not intended to be limited to the specific embodiments.

EXAMPLE I

To illustrate the Jaksic method of the prior art, 20 x 20 x 10 mm. graphite slabs cut from lumps of Grafilit B which is a commercial graphite sold for packing amalgam decomposers were dried by heating at 105° C. for 3 hours at an absolute pressure of 10 mm. Hg and the dried graphite was immersed in a solution of 12 g. of ammonium molybdate $(NH_4)_6Mo_7O_{24}\cdot 4H_2O$, in 1000 g. of distilled water for 3 hours under an absolute pressure of 10 mm. Hg. The graphite was filtered off and dried by heating at 105° C. for 3 hours at 10 mm. Hg.

Figure 3:
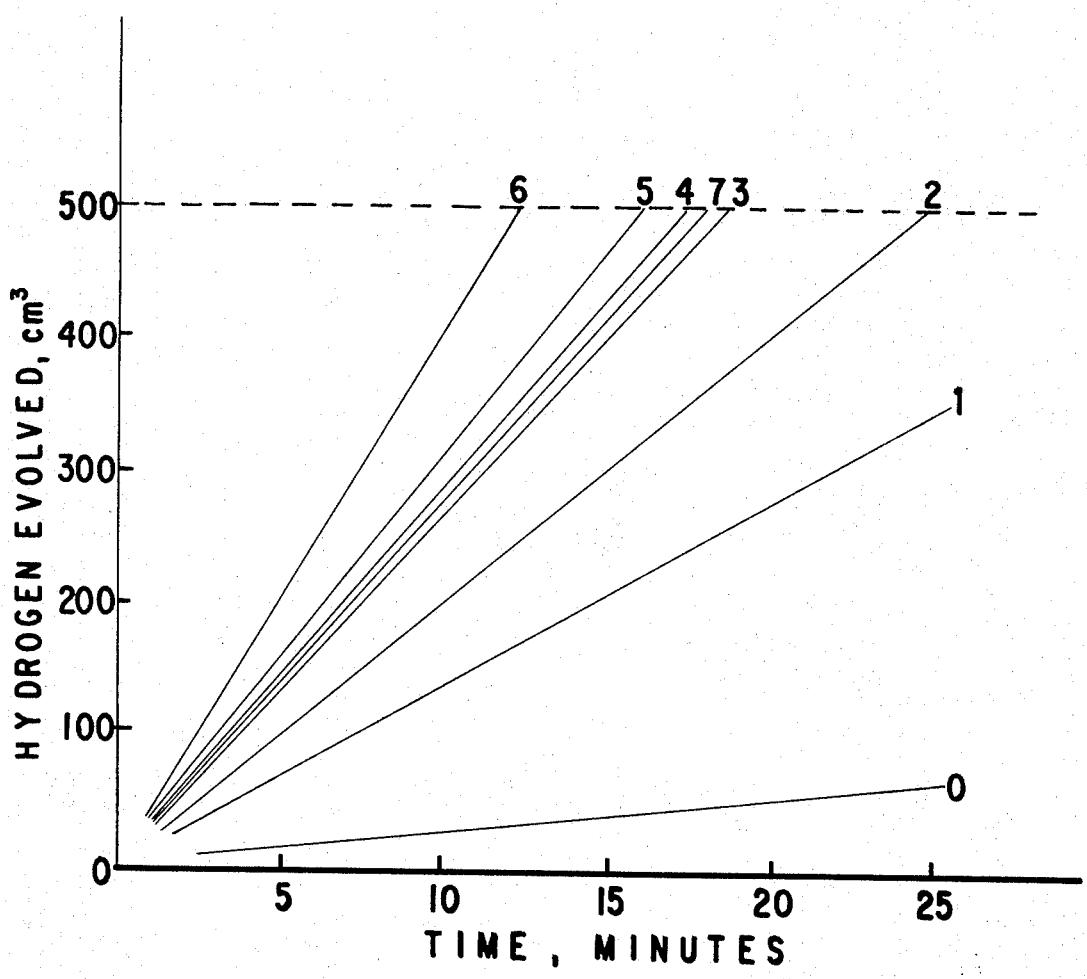
FIG. 3 is a graph of the amount of hydrogen evolved in amalgam decomposition as a function of time with graphite impregnated with the process of the invention and the prior art method of Jaksic.

The amalgam decomposition rate of the said impregnated graphite and untreated graphite was determined in a Lucite cylindrical vessel with a diameter of 90 mm. and 1000 mm. high immersed in a thermostatic bath operating at 60° C. The top cover was provided with a gas-tight mercury seal and was connected to an Orsat burette. The cell was partially filled with 100 ml. of an aqueous sodium hydroxide solution containing 300 gm. of sodium hydroxide per liter and when a temperature of 60° C. was reached 30 ml. of an amalgam of 0.3% sodium was added thereto followed by the graphite to be tested. As soon as the graphite was dropped in, the top cover was set in place and a magnetic stirrer floating atop the amalgam layer was set in motion. A stop watch was used to time the hydrogen evolution which proceeded at a uniform rate up to 500 ml. of hydrogen gas so the slope of the straight line for such evolution against time can be used to measure the amalgam decomposition. In FIG. 3, the decomposition of the untreated graphite is represented by line 0 and the decomposition of the graphite obtained by the Jaksic method is represented by line 1 and values of the slopes of the lines are approximately in the ratio of 5:1.

EXAMPLE II

Figure 1:
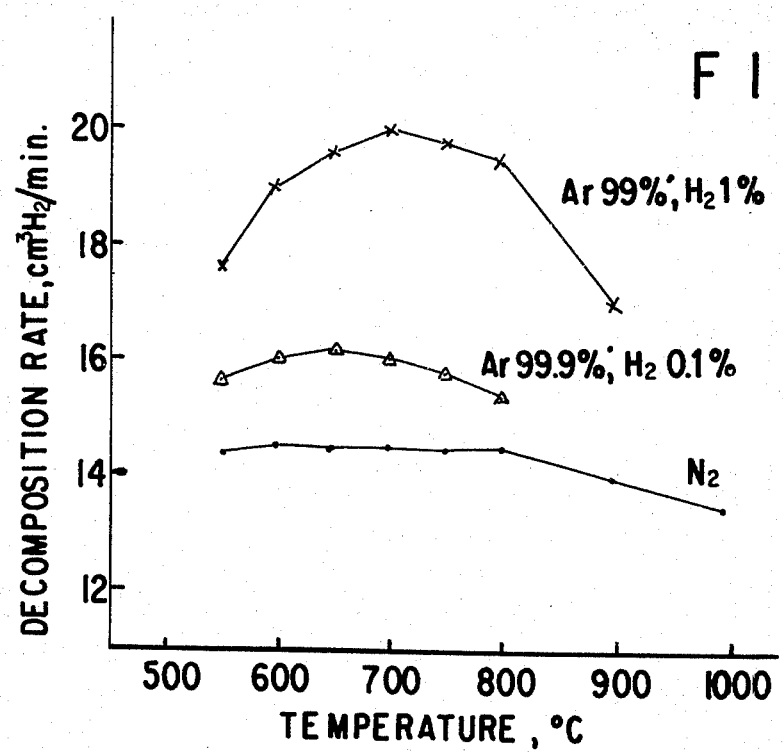
FIG. 1 and 2 are graphs of the amalgam decomposition rate as a function of heat treatment of graphite impregnated with the process of the invention.

Using the procedure of Example 1, the graphite was impregnated with a solution of 1000 ml. of distilled water containing 12 and 24 g. of ammonium molybdate $$(NH_4)_6Mo_7O_{24}\cdot 4H_2O$$

and the heat treatment was effected for 1 to 5 hours at temperatures ranging from 550 to 1000° C. under a nitrogen atmosphere and an argon atmosphere containing 0.1% and 1.0% hydrogen followed by cooling in the same atmosphere to obtain a graphite impregnated with a $MoO_3+MoO_3$ mixture having a majority of $MoO_2$. The amalgam decomposition rate was determined as before and the results are shown in FIG. 1. The decomposition in the presence of the argon-hydrogen atmosphere is effected by the following equations:

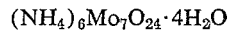

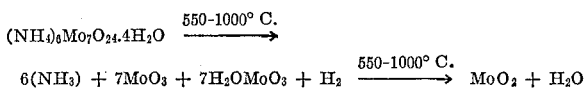

$$(NH_4)_6Mo_7O_{24}\cdot 4H_2O \xrightarrow{550-1000°\ C.} 6(NH_3) + 7MoO_3 + 7H_2OMoO_3 + H_2 \xrightarrow{550-1000°\ C.} MoO_2 + H_2O$$

Each of the three curves in FIG. 1 represents the amalgam decomposition rate as a function of heat treatment temperature, for one of the three investigated types of gaseous environment. The curve relating to heat treatment under a neutral atmosphere of nitrogen is practically flat, thus indicating no influence from the temperature value. Moreover, the decomposition rate thus obtained scarcely departs from that of impregnated graphite without thermal treatment. On the contrary, the other two curves display a marked peak value at about 700° C., the highest decomposition rate being attained by heat treatment at this temperature in the more reducing atmosphere (sample No. 12, Table I).

The ammonium molybdate is thermally decomposed in a neutral or air atmosphere so as to form $MoO_3$, while heat treatment under partial pressure of hydrogen brings about a reduction to $MoO_2$ which is the more active form.

Line 2 in FIG. 3 shows the hydrogen evolution measured as a function of time for sample No. 12 of Table I. A comparison of line 2 with lines 0 and 1 shows that the decomposition rate of the former is with reference to the other two in the ratio of 7:1 and 1.5:1 respectively.

The treatment was as shown in Table I.

TABLE I.—HEAT TREATMENT OF GRAPHITE IMPREGNATED WITH AMMONIUM MOLYBDATE

| Sample number | Gas | Temp., °C. |
|---|---|---|
| 1 | Nitrogen | 550 |
| 2 | do | 600 |
| 3 | do | 650 |
| 4 | do | 700 |
| 5 | do | 750 |
| 6 | do | 800 |
| 7 | do | 900 |
| 8 | do | 1,000 |
| 9 | 99% argon plus 1% $H_2$ | 550 |
| 10 | do | 600 |
| 11 | do | 650 |
| 12 | do | 700 |
| 13 | do | 750 |
| 14 | do | 800 |
| 15 | do | 900 |
| 16 | 99.9% argon plus 0.1% $H_2$ | 550 |
| 17 | do | 600 |
| 18 | do | 650 |
| 19 | do | 700 |
| 20 | do | 750 |
| 21 | do | 800 |

EXAMPLE III

Using the method of Example I, graphite was impregnated with a solution of ruthenium trichloride (5 gm. as Ru) $RuCl_3 3H_2O$, titanium trichloride (2.75 gm. as Ti), 1000 ml. of isopropyl alcohol and sufficient hydrogen peroxide to change the color from violet to reddish yellow. After immersion and drying as in Example I, the graphite was heated at 450° C. in air for 2 hours followed by natural cooling in air to obtain graphite impregnated with a coprecipitate of $RuO_2$ and $TiO_2$. The amalgam decomposition rate was determined as before and is represented by line 3 of FIG. 3.

EXAMPLE IV

Using the procedure of Example III, the graphite was impregnated with a solution of 1000 ml. of formamide containing $CaCl_2 \cdot 6H_2O$ (0.34 gm. as Ca), $$Zr(NO_3)_4 4H_2O$$

(4.5 gm. as Zr) and $RuCl_3 \cdot 3H_2O$ (5 gm. as Ru). The heat treatment was carried out under the same conditions as in Example III and resulted in the graphite being impregnated with a mixed oxide of $ZrO_2$, CaO, $RuO_2$. The function of the calcium oxide in the mixture was to decrease the brittleness of zirconium oxide. The amalgam decomposition rate for this impregnated graphite is represented by line 4 of FIG. 3.

EXAMPLE V

Figure 2:
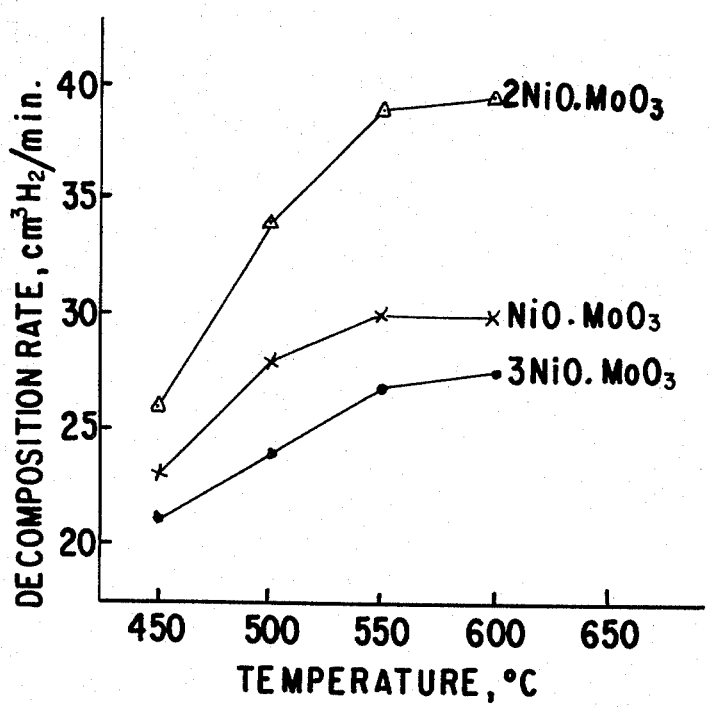

Three aqueous solutions of $NiCl_2 \cdot 6H_2O$ and $$(NH_4)_6Mo_7O_{24} \cdot 4H_2O$$

were prepared with stoichiometric ratios of nickel to molybdenum of 3:1, 2:1 and 1:1, respectively. The said solutions were used to impregnate the graphite as in Example I and the impregnated graphite was heated for 3 hrs. at the different temperatures shown in FIG. 2 and the results of the graph of FIG. 2 show that the best catalytic activity is obtained with the graphite samples with a nickel-molybdenum ratio of 2:1 heated at 550 to 600° C. The hydrogen evolution for the samples heated at 600° C. in FIG. 3 are represented by line 5 ($NiO \cdot MoO_3$), line 6 ($2NiO \cdot MoO_3$) and line 7 ($3NiO \cdot MoO_3$).

The results of FIG. 3 clearly show that the graphite of the invention impregnated with the valve metal oxides have a much greater catalytic activity than untreated graphite or graphite impregnated with molybdenum alone.

Various modifications of the products and the process of the invention may be made without departing from the spirit of scope thereof and it is to be understood that the invention is to be limited only as defined in the appended claims.

We claim:

1. Graphite impregnated with 1 to 30% by weight of the impregnated graphite of an oxide of a metal selected from the group consisting of titanium, tantalum, zirconium, aluminum and molybdenum coprecipitated with an oxide of a metal of the eight group of the periodic table.

2. The graphite of claim 1 wherein the oxide of the metal of the eighth group of the periodic table is a metal selected from the group consisting of nickel, palladium, iridium, osmium, ruthenium, rhodium, cobalt and iron.

3. The graphite of claim 2 impregnated with a mixed oxide of $ZrO_2$, CaO and $RuO_2$.

4. The graphite of claim 1 impregnated with a mixed oxide of $RuO_2$ and $TiO_2$.

5. The graphite of claim 2 impregnated with a mixed oxide of NiO and $MoO_3$.

6. The graphite of claim 2 impregnated with a mixed oxide of NiO and $MoO_2$.

7. The graphite of claim 2 impregnated with a mixed oxide consisting of NiO, $MoO_2$ and $MoO_3$.

8. The graphite of claim 1 in the form of lumps or spheres with a 10 to 40 mm. diameter.

References Cited
UNITED STATES PATENTS

| 2,315,346 | 3/1943 | Musgrave | 252—508 X |
| 1,311,133 | 7/1919 | Mott | 252—507 X |
| 1,947,692 | 2/1934 | Beyer | 252—506 |
| 3,262,005 | 7/1966 | Rick | 252—506 X |
| 2,134,543 | 10/1938 | Andrews | 252—447 X |
| 3,595,614 | 7/1971 | Ford et al. | 252—447 X |
| 3,575,888 | 4/1971 | Long | 252—447 X |

PATRICK P. GARVIN, Primary Examiner

U.S. Cl. X.R.

204—98; 252—506, 507, 508